Oct. 7, 1969  R. E. KITTREDGE ET AL  3,470,629
METHOD OF VISUALLY SIMULATING STAR FIELDS AND THE LIKE
Original Filed July 22, 1967  2 Sheets-Sheet 1

INVENTOR.
RAYMOND E. KITTREDGE, KURT LEVY
AND JOSEF F. KRIPL
BY Jack Lauser

INVENTOR.
RAYMOND E. KITTREDGE, KURT LEVY
AND JOSEF F. KRIPL
BY Jack Larsen 3,470,629
METHOD OF VISUALLY SIMULATING STAR
FIELDS AND THE LIKE
Raymond E. Kittredge, Chenango Bridge, Kurt Levy,
Vestal, and Josef F. Kripl, Binghamton, N.Y., assignors
to Singer-General Precision, Inc., Binghamton, N.Y., a
corporation of Delaware
Continuation of application Ser. No. 474,082, July 22,
1967. This application Sept. 1, 1967, Ser. No. 665,176
Int. Cl. G09b 27/04, 29/00
U.S. Cl. 35—44                                             5 Claims

ABSTRACT OF THE DISCLOSURE

A method of presenting a simulated visual image of any one of a number of star fields, each including a navigational star, by illuminating a single light point representing the navigational star while at the same time illuminating one of a plurality of other light points which are positionally related to one another and to the first light point so as to identify the latter as a different navigational star in the case of each different plurality of light points which may be illuminated. All of the individually operable groups of light points, as well as the single light point representing the navigational star, are permanently arranged on a plate, or the like, so that the positional relationship will remain invariable with the degree of accuracy with which the points are initially positioned on the plate.

---

This is a continuation of application Ser. No. 474,082 filed July 22, 1967, now abandoned.

This invention relates to a visual simulation method, and more particularly, to a method for accurately presenting simulated star fields to student-trainees as a training aid in making accurate navigational "fixes."

For the obvious reason that the operation of an aircraft or a manned spacecraft is inherently dangerous, the advantages of providing a grounded simulator representing the aircraft or spacecraft are readily apparent. The initial training and testing of inexperienced operators prior to their undertaking the control of an actual craft, as well as the retraining and retesting of the more experienced operators, requires such grounded simulators. In order that the training and testing be as realistic as possible, visual display systems have recently been added to such simulators, in order that take-off, maneuvering, docking and landing problems may be presented to the student-trainees. Additionally, since the field of view displayed to the student-trainees must vary in response to operation of the simulated vehicle, it is required that the displayed scenes be randomly selectable.

More importantly, with the advent of long range aircraft and spacecraft, such as the now well-known Gemini and Apollo space vehicles, the need has arisen for a ground-based simulator capable of instructing the student-trainees in precise navigational techniques. During flight, operators of space vehicles, and other long range aircraft, rely primarily upon one of the standard navigational stars, or may even utilize any one of the designated 58 navigational stars for a "fix." For an extended trip, one or more of such stars and their identifying surrounding star patterns are normally relied on in combination with a specific reference point on the earth or other heavenly body to provide the operator with precise knowledge of the vehicle's position. A sextant is utilized to provide the operator with information concerning his position in space, and accordingly, for proper training a simulated sextant must be included in trainers and simulators.

According to the prior art, navigational star fields, or constellations, have been presented to the student-trainees by film slides or film strips. An individual slide or a portion of a film strip is provided for each constellation or star field to be displayed and the slides are mechanically interchanged when a different navigational star is selected for viewing. As may be expected, even the use of complicated mechanical devices to interchange the slides and align them accurately for taking positional measurements, still results in positional errors in the displayed star pattern because of the large scale reduction in the scenes displayed. A minute positional error may cause an error measured in millions of miles in the position of the star being employed for a navigational fix.

According to the present invention however, there is provided a novel visual simulation method which not only displays a number of star field patterns without any positional errors whatever, but also is readily adaptable for use when any number of light point sources are to be selectively illuminated.

Briefly, in a preferred embodiment of the invention a single background or "star" plate has superimposed thereon a plurality of star fields or patterns with the navigational star being fixedly positioned in relation to the plural superimposed star fields.

Thus it is an important object of the present invention to provide a realistic visual display simulating a plurality of star fields which may be selectively and accurately positioned.

It is another object of the present invention to provide a realistic simulated visual display of navigational star fields which may be employed for precise navigational measurements.

Still a further object of the present invention is the provision of a plurality of simulated star scenes from a single, exactly positioned plate.

Other objects of the invention will in part be obvious and will in part appear hereinafter.

The invention accordingly comprises the several steps and the relation of one or more of such steps with respect to each of the others thereof, which will be exemplified in the method hereinafter disclosed, and the scope of the invention will be indicated in the claims.

For a fuller understanding of the nature and objects of the invention, reference should be had to the following detailed description taken in connection with the accompanying drawings, in which.

As mentioned previously, during outer space travel a special narrow field of view, high-power sextant is generally utilized to obtain positional fixes in space. The sextant is normally used in combination with a high-power telescope having a much wider field of view, the telescope functioning as a finder scope. Both instruments are commonly geared to operate together, with the telescope providing a means to locate a desired star field which is roughly centered thereby, and the sextant providing a means to view a small section of the sky surrounding the chosen navigational star for accurate positioning measurements. The field of view through a telescope may be 60 degrees, while the field of view through the sextant may be 1.9 degrees, by way of example.

Figure 1:
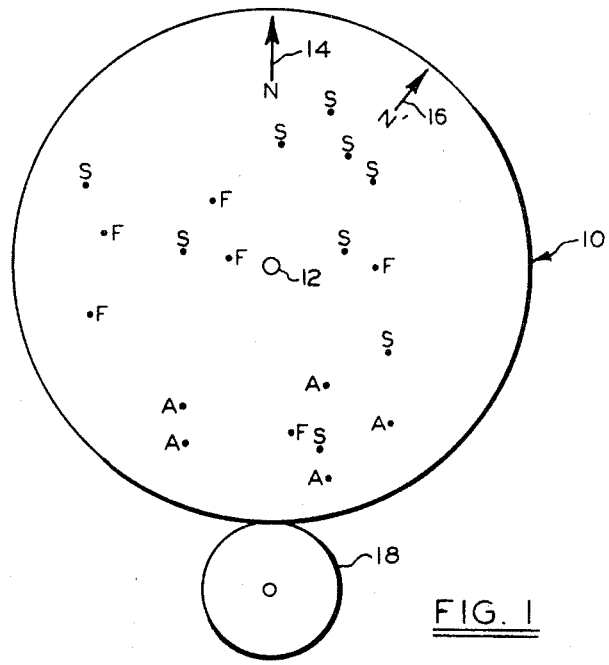
FIG. 1 is an elevational view of a preferred embodiment of the present invention.

An embodiment of the present invention is illustrated in FIG. 1 and, as shown, includes a background or star plate 10, which may be in the shape of a circular disc, for simulating the full field of view presented to the sextant. The center of plate 10 has formed therein an aperture 12 through which light may pass to simulate the navigational star being viewed to provide the navigational position fix. To enable the student-trainee to recognize the navigational star simulated by center hole 12, a number of smaller additional holes are drilled into plate 10 representing, when selectively illuminated, various star patterns or fields including all of the stars located within at least 2½ degrees of the navigational star. To provide a realistic simulation of all the 58 navigational stars presently used, plate 10 may contain approximately 256 holes representing stars down to the sixth magnitude, by way of example. It has been found that for most training purposes however, approximately half the number of such holes are sufficient to simulate the 28 most commonly used navigational stars.

In FIG. 1, only three surrounding star patterns are shown for reasons of simplicity and ease of explanation. The stars surrounding the navigational star Alpheratz are indicated by openings A and include 5 surrounding stars, and the stars in the patterns representing those surrounding navigational star Fomalhaut are indicated as holes F, there being 6 surrounding stars. Continuing, the Sirius star pattern is indicated by holes S, there being 9 stars in the Sirius star pattern. In a similar manner, additional star field patterns may be simulated, it being important to note, as more particularly hereinafter described, that the navigational star always is represented by hole 12, the surrounding stars being selectively illuminated in accordance with the navigational star being displayed. The celestial north of the star patterns viewed is indicated by arrow 14, which may be in the position shown in FIG. 1 for most star patterns, including the Alpheratz and Fomalhaut constellations. When interference in locating the holes of the various star patterns occurs, however, plate 10 may be rotated until the interference is removed, and the holes representing the interfering star pattern may be then drilled in plate 10. In FIG. 1, for instance, the Sirius star pattern is shown as being rotated approximately 30 degrees from the viewing celestial north indicated by arrow 14, providing a Sirius celestial north indicated by arrow 16. Rotation of plate 10 by gear 18 until the arrow 16 is moved to the shown position of arrow 14 in FIG. 1 is required when the Sirius star pattern is viewed, i.e., the plate would need to be rotated counterclockwise from the position shown in FIG. 1 through an angle equal to that between arrows 14 and 16.

In order to provide a selected simulated star pattern display, individual miniature bulbs may be placed in each of the holes of plate 10, particular groups of the bulbs being illuminated in accordance with the pattern to be displayed. However, since the holes for the surrounding stars must be of extremely small diameter for realistic star simulation, and further that one of a displayed group of light bulbs may burn out, thereby creating an incorrect pattern, light piping from each hole of the individual constellations to single corresponding light sources is preferred.

Figure 2:
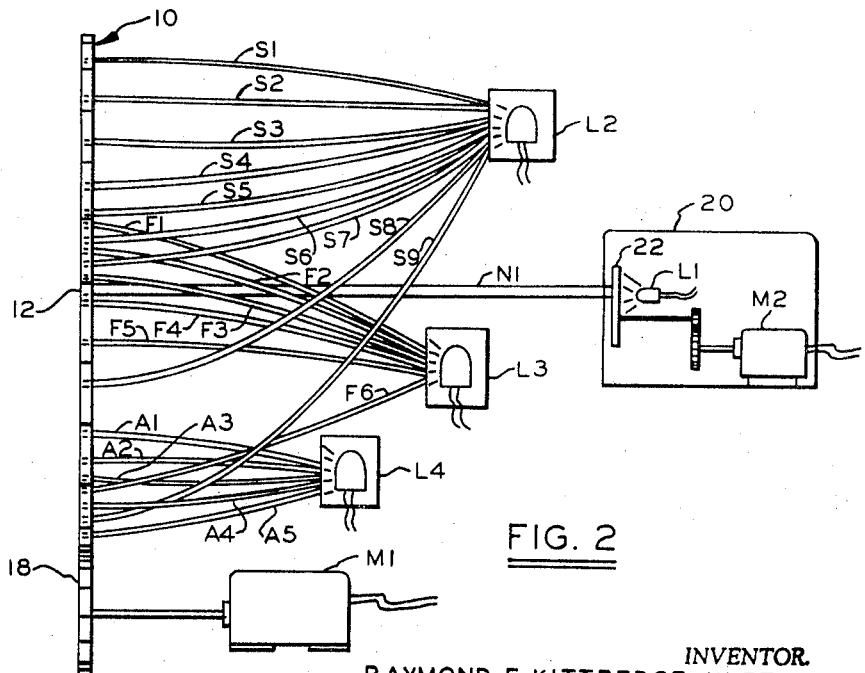
FIG. 2 is a side view of the embodiment shown in FIG. 1.

In FIG. 2 there is shown a plurality of optical fibers for each of the star patterns. For the Sirius constellation, for instance, respective optical fibers S1 through S9 are shown as extending from each of the holes S, S (FIG. 1) to a light source indicated generally by L2. One end of each fiber, which may have a diameter of 0.004 in., by way of example, is placed in each hole S, S to represent the surrounding stars in their exact position when viewed. It is important to note that the fiber diameter must be less than the resolution of the human eye at the magnification in the sextant to provide a realistic star field display. The other ends of the fibers S1 through S9 of the Sirius constellation are then assembled together at light source L2. Thus, the number of light sources may be drastically reduced in this manner over the use of the many individual miniature bulbs, and further, the light sources may be of the conventional type which are generally larger and more reliable. Also, the light sources such as L2 may be placed further away from plate 10, and since the fibers are pliable, rotation of plate 10 is not affected. Or, if desired, the whole unit, including the light sources, may be rotated. Finally, if a light source burns out, the whole constellation is affected and the error is readily apparent which can be easily corrected by replacing the burned-out bulb. Similar optical fibers F1 through F6, and A1 through A5 are provided for the constellations Fomalhaut and Alpheratz, and are connected to light sources L3 and L4, respectively.

Optical fiber bundles of the type presently manufactured by the American Optical Company, Catalog Number LG-1 may be utilized in the apparatus of the invention, or alternately, conventional pliable lucite rods may also be used, it being important that the diameter of the fiber be kept small, so that the size, as represented to the eye, be less than one minute on arc, which is the resolution of the eye.

Because various navigational stars differ in brilliance and color, a realistic simulation of these stars requires that the light emanating from center hole 12 be varied in intensity and color. In FIG. 2 there is illustrated a means of producing this desired variation. Extending between center hole 12 and a housing 20, containing a light source L1, is an optical fiber N1. Light source L1 may be preferably of a higher light intensity than the other light sources since the navigational star is more prominent than its surrounding neighbors, and fiber N1 may have a slightly larger diameter but still less than the resolution of the eye. Positioned between light sources L1 and fiber N1, may be a filter wheel 22 having a plurality of apertures, one aperture for each navigational star being simulated. The apertures contain filters, which control both the intensity and color of the light viewed from center hole 12, to suit each individual navigational star. Since star identification by navigators involves the determination of navigational star intensity and color, the control of these variables may be easily accomplished by the filter element shown in FIG. 2.

It should be understood that other methods may be utilized to achieve the same control, namely, that the voltage energizing light source L1 may be varied to produce the desired intensity, or light source L1 may be movably mounted with relation to fiber N1, colored filters being provided to modify only the displayed color of the navigational star. Further, small individual filters may be included with various of the surrounding stars which require modification of their intensity in accordance with their magnitude.

Figure 3:
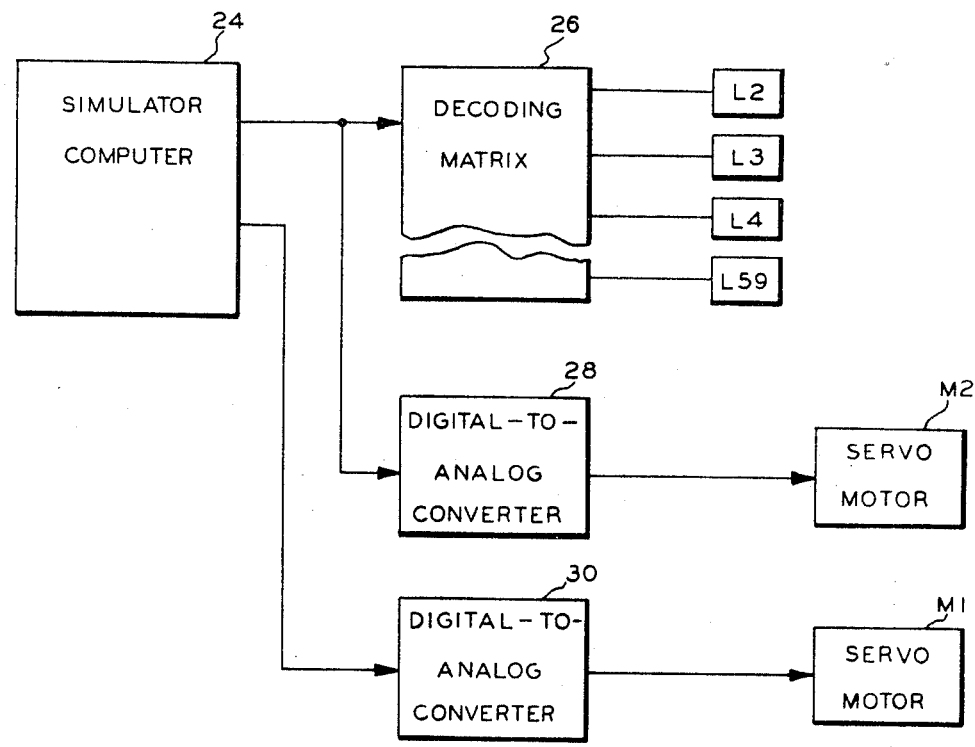
FIG. 3 is a block diagram useful in understanding the operation of the preferred embodiment.

In the grounded spacecraft simulator herein involved, a digital computer is utilized to provide output signals indicative of the simulated spacecraft's position. These signals, among other uses, are utilized to control the visual display presented to the student-trainee, as well as the display seen through the telescope and the star fields through the sextant. Referring to FIG. 3, simulator computer 24 provides a pair of digital output signals indicative of the position of the craft, as well as the sextant, in relation to the star patterns to be viewed. One of the digital signals is fed to a decoding matrix 26, which may be of the conventional type that receives a digital input signal and operates to energize one of a number of output lines in accordance with the value of the applied digital signal. Since there may be a total of 58 possible star fields selectively presented for display, a seven-bit digital word is all that is required for displaying the selected one of the star fields. The energized output line of decoding matrix 26 illuminates any one of light sources L2 through L59, thus providing the proper star field for viewing. Since L1, representing the navigational star, is illuminated at all times, the energization thereof need not be controlled by computer 24 and decoding matrix 26.

However, the intensity and color of light source L1 must be varied as described previously. To accomplish the variation, a first digital-to-analog converter 28 is supplied with the seven bit digital output signal provided by simulator computer 24. The resultant analog output signal from D-A converter 28 is applied to a servo system containing motor M2 which properly positions filter wheel 22 (see FIG. 2) in accordance with the magnitude of the analog signal.

A second digital output signal from computer 24 is applied to a second digital-to-analog converter 30 only when the star field to be displayed is one which must be re-aligned for viewing. The Sirius star pattern, for instance, because of the interference of its position on star plate 10 with the other star patterns, is placed on plate 10 at an angle of approximately 30 degrees from the viewing celestial north indicated by arrow 14 in FIG. 1. Accordingly, when the Sirius star field is displayed, plate 10 must be rotated to properly re-align this star field. Other interfering star fields must likewise be re-aligned for viewing, and when Sirius or one of the other interfering star patterns is to be displayed, simulator computer 24 provides a second output signal which is fed to D-A converter 30. The resultant analog output signal energizes servo motor M1, which in turn rotates plate 10 through gear 18 to re-align the interfering star pattern to the celestial north direction indicated by arrow 14. The star patterns are normally viewed through an optical system having provision made therein for the shifting and/or rotating of the line of sight according to the computer data representing the actual attitude of the simulated spacecraft. Thus, when the student-trainee looks through the sextant, the star field displayed will be correctly presented in accordance with the spacecraft position.

It should be understood that other means may be provided to select and position the star pattern for display, the block diagram of FIG. 3 being merely one embodiment of accomplishing this result. For instance, instead of rotating star plate 10 to remove star field interference, each of the interfering holes may be connected by a single length of light piping to a separate light source. Then, through the use of appropriate logic circuitry, the digital output signal from computer 24 may be utilized to illuminate both the separate light source and the main light source of each star pattern. It can be easily noted that the rotation of star plate 10 would thus be unnecessary and the entire star field display would have no moving parts to add any possible minor positioning errors.

Although the specific embodiment of the present invention is disclosed as utilizing a single plate with fiber optics to provide the desired simulated star field display, other forms may be utilized. As mentioned previously, individual lamps in every hole may be used, or a pair of vertical independently movable plates with a single light source may be utilized. In the latter embodiment, one plate may contain superimposed star patterns of the navigational stars, while the other plate may contain a plurality of holes which unmask each star pattern as the plates are moved with respect to each other. A single light source behind the pair of plates, which may be of rectangular or circular shape, may thus provide the viewer with the desired simulated star pattern display. If circular plates are used, the navigational star may be simulated by a single central hole in both plates similar to that described in the preferred embodiment, and if rectangular plates are used, each plate may contain a narrow horizontal elongated opening at the center of each plate. The intensity and color control of the navigational star may be achieved by means of optical filters.

What has been described is a method for visual display wherein navigational star fields are presented for viewing in an accurate and realistic manner. The stars are all superimposed on a single plate and are accurately positioned with respect to each other and the navigational star, since the navigational star is preferably in the exact center of the plate.

It will thus be seen that the objects set forth above, among those made apparent from the preceding description, are efficiently attained, and since certain changes may be made in the above method without departing from the scope of the invention, it is intended that all matter contained or shown in the accompanying drawings shall be interpreted as illustrative and not in a limiting sense.

We claim:

1. The method of individually simulating any one of a plurality of star fields, each including a navigational star, said method comprising:
    (a) illuminating a first light point representing said navigational star;
    (b) illuminating a plurality of second light points representing stars positionally related to one another and to said first light point in such a way as to simulate a first actual star field which identifies said first light point as a first navigational star;
    (c) extinguishing the illumination of said plurality of second light points while continuing to illuminate said first light point; and
    (d) illuminating a plurality of third light points representing stars positionally related to one another and to said first light point in such a way as to simulate a second actual star field which identifies said first light point as a second navigational star.

2. The invention according to claim 1 and further including the step of changing the color and intensity of said first light point as the latter is used to represent different navigational stars.

3. The invention according to claim 1 and including the initial step of providing a first, single aperture and second and third sets of apertures in an opaque plate and selectively illuminating said apertures to provide said first, second and third light points, respectively.

4. The invention according to claim 3 and including the step of rotating said plate about an axis through said first aperture.

5. The invention according to claim 4 including the step of illuminating said first light point by a single first light source, illuminating said plurality of second light points by a second single light source, and illuminating said plurality of third light points by a third single light source.

References Cited

UNITED STATES PATENTS

| | | |
|---|---|---|
| 1,828,057 | 10/1931 | Lunt et al. |
| 2,507,909 | 5/1950 | Kaysen. |
| 2,516,418 | 7/1950 | Ramsay _____ 35—19 X |
| 2,651,115 | 8/1953 | Davies _____ 35—19 |
| 2,994,971 | 8/1961 | Meisenheimer et al. |
| 3,109,065 | 10/1963 | McNaneye. |
| 3,184,872 | 5/1965 | Way. |

JEROME SCHNALL, Primary Examiner